United States Patent [19]

Nakayama

[11] Patent Number: 4,747,893
[45] Date of Patent: May 31, 1988

[54] TAPING DEVICE

[75] Inventor: Katsusaburo Nakayama, Yokohama, Japan

[73] Assignee: Kabushiki Kaisha Toshiba, Kawasaki, Japan

[21] Appl. No.: 60,008

[22] Filed: Jun. 9, 1987

[30] Foreign Application Priority Data

Jun. 13, 1986 [JP] Japan ................. 61-137892

[51] Int. Cl.⁴ ............................. B65H 81/00
[52] U.S. Cl. ..................... 156/64; 156/157; 156/185; 156/195; 156/350; 156/428; 156/504; 242/7.08
[58] Field of Search ........ 156/195, 200, 425, 430–432, 156/185, 187, 502, 504, 64, 350, 353; 242/4 B, 6, 7.01, 7.08, 7.21; 156/468, 391, 392, 157, 428

[56] References Cited

U.S. PATENT DOCUMENTS

| 1,582,026 | 4/1926 | Duclos | 156/432 X |
| 3,328,224 | 6/1967 | Kennedy et al. | 156/432 X |
| 3,698,988 | 10/1972 | Skobel | 156/432 X |
| 4,543,149 | 9/1985 | Abe et al. | 156/350 |
| 4,643,783 | 2/1987 | Hogenson | 156/504 |
| 4,707,214 | 11/1987 | Nithart et al. | 156/185 X |

FOREIGN PATENT DOCUMENTS 48-41054 6/1973 Japan.
53-14723 5/1978 Japan.

Primary Examiner—David Simmons
Attorney, Agent, or Firm—Foley & Lardner, Schwartz, Jeffery, Schwaab, Mack, Blumenthal & Evans

[57] ABSTRACT

An automatic taping device which is used for winding insulation tapes around an object such as an electrical conductor bar. This device has a supporting frame which is driven along the object, and a revolving ring with a layer of the insulation tape around it, which is arranged on the supporting frame and which revolves around the object continuously winding the insulation tape(s) supplied from the layer. The device also has an adhesive feeder which feeds adhesive onto the outside of the insulation tape(s) on the revolving ring when the thickness of the layer of the insulation tape has become less than a stipulated value, and it also has a tape feeder which feeds an insulation tape to the revolving ring after the adhesive is fed there.

10 Claims, 5 Drawing Sheets

TAPING DEVICE

BACKGROUND OF THE INVENTION

1. Field of the Invention

This invention relates to a taping device, and more particularly to a taping device which can wind a plurality of insulation tapes in series around an object without stopping for connecting ends of the insulation tapes.

2. Description of the Prior Art

Automatic taping devices used for winding insulation tapes around electrical conductors, such as stator coils of a turbine generator, are disclosed in Japanese Patent Disclosure (Kokai) No. 48-41054 and Japanese Patent Publication (Kokoku) No. 53-14723. The taping devices disclosed in those references have a supporting frame which is driven along an object to be taped, and a revolving ring arranged on the supporting frame which feeds an insulation tape to the object. The taping devices disclosed in those references, however, do not have means for connecting the tape ends. Therefore, when a reeled tape is exhausted, the taping devices have to be stopped, and a new reeled tape has to be replaced manually, which requires a lot of manpower.

SUMMARY OF THE INVENTION

It is therefore an object of this invention to automate the feeding of reeled tapes and the connection of tape ends, and to reduce the manpower required to operate a taping device.

One object of the invention resides in the provision of an improved taping device.

Another object of the invention is to provide an improved method of winding insulation tapes around an object.

According to one aspect of the invention there is provided a taping device comprising a supporting frame which is adapted to be driven along an object to be wound with an insulation tape; a revolving ring revolvably arranged on the supporting frame, wherein the revolving ring has a layer of insulation tape around it; means for rotating the ring around the object to wind the insulation tape under tension around the object; means for detecting a thickness of the layer of the insulation tape on the revolving ring; an adhesive feeder for feeding an amount of adhesive onto the outside surface of the insulation tape on the revolving ring when the thickness of the layer of the insulation tape on the revolving ring is less than a predetermined value; a tape feeder for feeding an auxiliary insulation tape to the layer of the insulation tape around the revolving ring after the adhesive is fed onto the insulation tape on the revolving ring; and a tape holder arranged on the supporting frame for holding a plurality of reeled auxiliary insulation tapes and including means for supplying the auxiliary insulation tapes to the tape feeder one after another.

According to another aspect of the invention there is provided a method of winding an insulation tape around an object, the method comprising: (a) feeding an insulation tape under tension around the object from an inner end of a layer of insulation tapes on a revolving ring which continuously revolves around the object; (b) detecting the thickness of the layer of the insulation tape on the revolving ring; (c) feeding an amount of adhesive onto the insulation tape on the revolving ring when the thickness of the layer of the insulation tape on the revolving ring becomes less than a predetermined value; (d) subsequently feeding an auxiliary reel of insulation tape to the outside of the layer of the insulation tape on the revolving ring; (e) holding a plurality of auxiliary reels of insulation tape; and (f) repeating steps (b) through (d) to feed said plurality of auxiliary reels of insulation tape; and (f) repeating steps (b) through (d) to feed said plurality of auxiliary reels of insulation tape one after another.

Further objects, features and advantages of the present invention will become apparent from the detailed description of preferred embodiments that follows, when considered with the attached figures of drawings.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

DETAILED DESCRIPTION OF THE PREFERRED EMBODIMENTS

Figure 1:
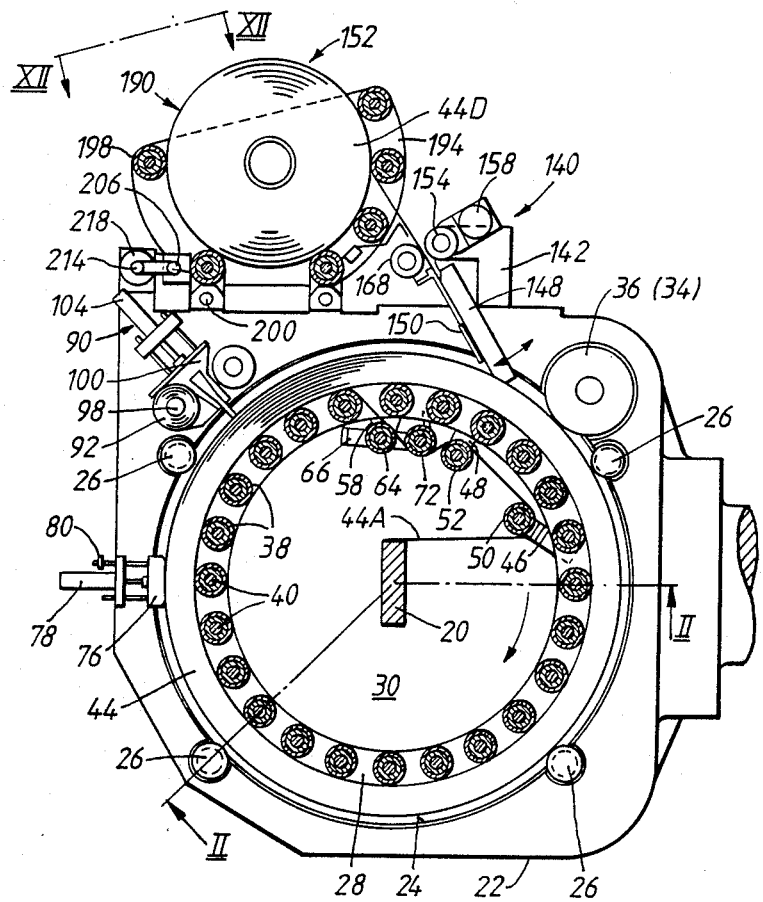
FIG. 1 is a partial cross-sectional front view of the essential part of a taping device according to the present invention, the view taken along line I—I of FIG. 2.
Figure 2:
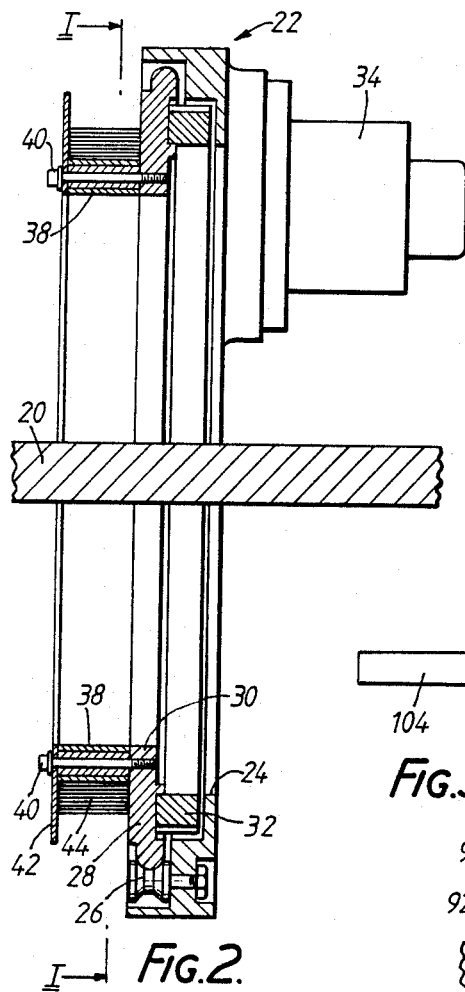
FIG. 2 is an enlarged fractional cross-sectional view taken along line II—II of FIG. 1.
Figure 5:
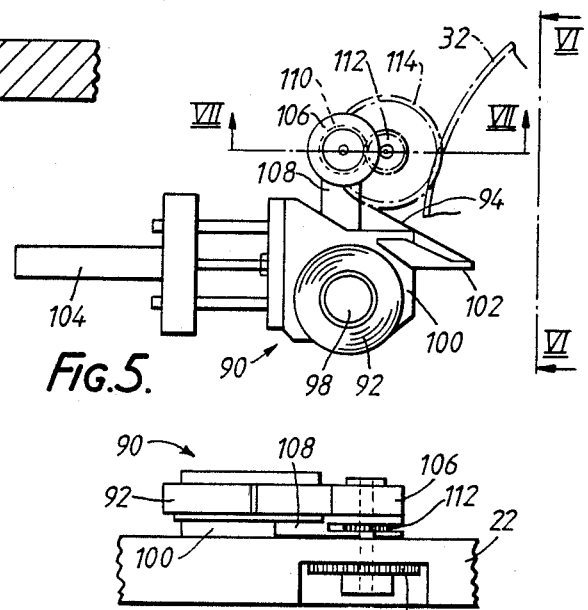
FIG. 5 is an enlarged front view of an adhesive feeder shown in FIG. 1.
Figure 6:
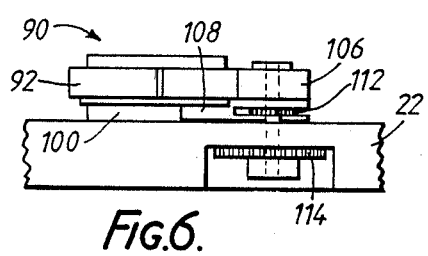
FIG. 6 is a fractional view taken along line VI—VI of FIG. 5.
Figure 7:
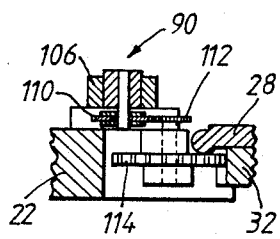
FIG. 7 is a fractional cross-sectional view along line VII—VII of FIG. 5.
Figure 8:
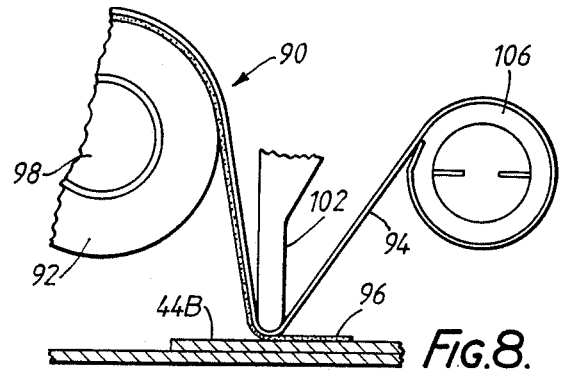
FIG. 8 is an enlarged fractional front view of the adhesive feeder shown in FIG. 5.

Referring to FIG. 1, an electrical conductor bar (20) such as a half-turn coil of a turbine generator is fixed on a stable bed (not shown). A supporting frame (22) is attached to a moving vehicle (not shown) which moves along the bar (20), as in the references mentioned above. The supporting frame (22) has a round opening (24), and four supporting rollers (26) are rotatably supported on the supporting frame (22) near the opening (24). A revolving ring (28) with a round opening (30) is rotatably supported by the supporting rollers (26) as shown in FIGS. 1 and 2.

A large spur gear ring (32) is fixed to one side of the revolving ring (28). A main motor (34) with a driving pinion (36) is attached to the supporting frame (22), so that the driving pinion (36) drives the large spur gear ring (32), thereby causing the revolving ring (28) to rotate.

The revolving ring (28) has many circumferential rollers (38), which are rotatable around circumferential roller axes (40) which are attached at equal intervals on one side of the revolving ring (28)—the opposite side from the large spur gear ring (32). A ring plate (42) is attached to the circumferential roller axes (40), so as to make it easy to wind insulation tapes (44) around the circumferential rollers (38), forming a layer of insulation tapes (44).

Figure 3:
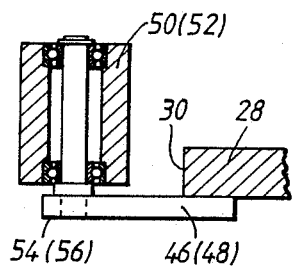
FIG. 3 is an enlarged cross-sectional view showing a first or second guide roller and its vicinity shown in FIG. 1.

Referring to FIGS. 1 and 3, first and second supporting rods (46) and (48) are attached to the revolving ring (28) jutting into the opening (30) of the revolving ring (28). First and second guide rollers (50) and (52) are rotatably attached to the tips (54) and (56) of the first and the second supporting rods (46) and (48), respectively.

Figure 4:
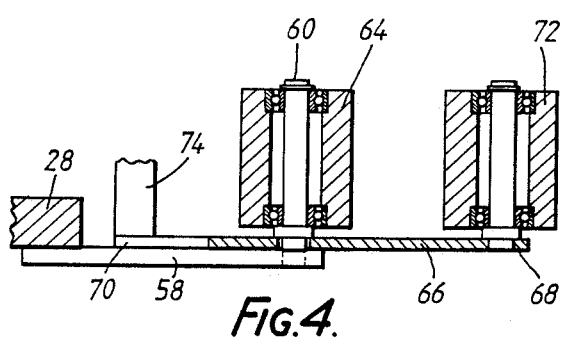
FIG. 4 is an enlarged cross-sectional view showing a third guide roller, a drifting roller and their vicinity show in FIG. 1.

Referring to FIGS. 1 and 4, a third supporting rod (58) is attached to the revolving ring (28) jutting into the opening (30) of the revolving ring (28). The third supporting rod (58) has an axis (60) at the tip (62), and a third guide roller (64) and a swinging lever (66) and arranged so as to be independently rotatable around the axis (60). The swinging lever (66) has two tips (68) and (70) located on opposite sides of the axis (60). A drifting roller (72) is rotatably attached to one tip (68) of the swinging lever (66), and a projection (74) is attached to the other tip (70) of the swinging lever (66). The swinging lever (66) swings in accordance with the tension of the insulation tape (44A) in response to a spring (not shown). The movement of the projection (74) is detected by a sensor (not shown).

The inner end of the layer of the insulation tape (44A) on the circumferential rollers (38) is guided through a gap between two adjacent circumferential rollers (38), and then tangentially contacts with the third guide roller (64), the drifting roller (72), the second guide roller (52) and the first guide roller (50), in that order. The insulation tape (44A) is then fed to the electrical conductor bar (20) to be wound.

Referring to FIG. 1, a tension shoe (76), which is pressed by a first air cylinder device (78) against the outside of the layer of the insulation tapes (44) on the revolving ring (28), is attached to the supporting frame (22). The tension shoe (76) adds tension on the insulation tapes (44) around the revolving ring (28) by the friction between the tension shoe (76) and the tapes (44). The tension is controlled depending on the detected movement of the projection (74) of the swinging lever (66). A thickness detector (80) is attached to the tension shoe (76) which can detect the thickness of the layer of the insulation tapes (44) on the revolving ring (28).

An adhesive feeder (90), which supplies a stipulated amount of adhesive on the outside end (44B) of the insulation tape (44), is attached to the supporting frame (22).

The adhesive feeder (90) is constructed as shown in FIGS. 5, 6, 7 and 8. An adhesive tape (92), consisting of a separation tape (94) and a layer of adhesive (96) stuck to one surface of the separation tape (94), is wound on an adhesive tape reel (98). The adhesive tape reel (98) is rotatably supported on an adhesive presser (100) which has a pressing shoe (102). The presser (100) can be moved by a second air cylinder device (104) so as to depress and retract the adhesive tape (94) with the pressing shoe (102) perpendicularly onto the outer surface of the insulation tape (44) on the revolving ring (28).

When the pressing shoe (102) presses the adhesive tape (92), the adhesive (96) sticks to the outer surface of the insulation tape (44) on the revolving ring (28), while the separation tape (94) is wound up on a separation tape reel (106).

The adhesive presser (100) has an arm (108), on which the separation tape reel (106), a first gear (110), a second gear (112) and a third gear (114) are rotatably arranged. The separation tape reel (106) and the first gear (110), and the second gear (112) and the third gear (114) are fixed to each other. The first gear (110) and the second gear (112) mesh with each other.

When the thickness of the layer of the tapes (44) on the revolving ring (28) detected by the thickness detector (80) is less than a stipulated value, the second air cylinder device (104) is activated to press the adhesive presser (100) toward the revolving ring (28). At the same time, the third gear (114) and the spur gear ring (32) become engaged, and the separation tape reel (106) begins to wind the separation tape (94).

When a stipulated amount of adhesive (96) is stuck to the insulation tape (44) on the revolving ring (28), the adhesive presser (100) is drawn back away from the revolving ring (28) by the second air cylinder device (104), and the third gear (114) detaches from the spur gear ring (32). Then the separation tape reel (106) stops.

Figure 9:
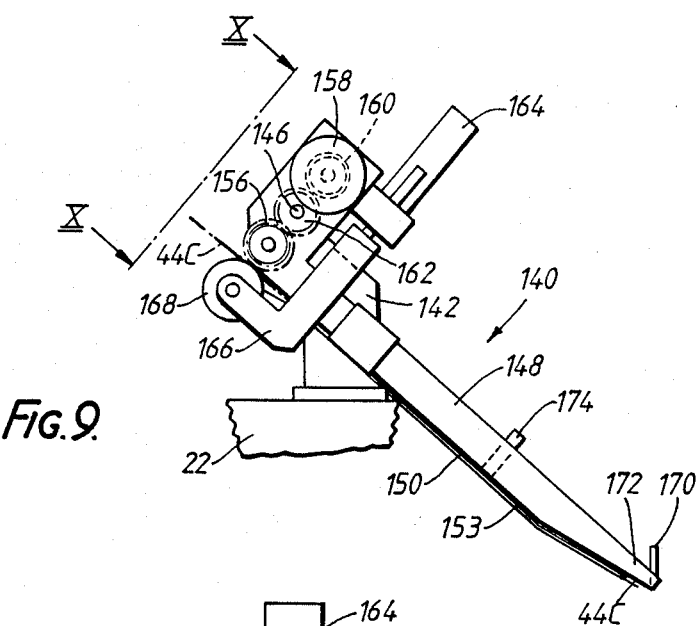
FIG. 9 is an enlarged front view of the tape feeder shown in FIG. 1.
Figure 10:
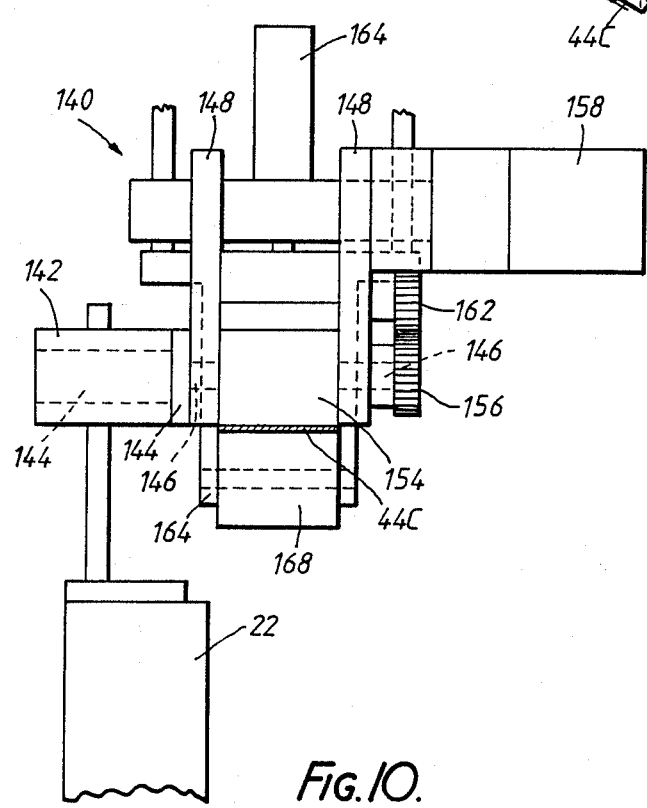
FIG. 10 is an enlarged view taken along line X—X of FIG. 9.

Referring to FIGS. 1, 9, 10 and 11, a tape feeder (140) is attached to the supporting frame (22). The tape feeder (140) is constructed as shown in FIGS. 9 and 10. A bracket (142) is attached to the outside of the supporting frame (22).

Figure 11:
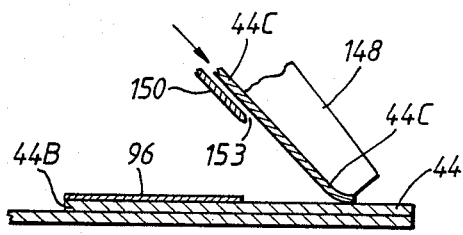
FIG. 11 is an enlarged fractional front view of the bottom end of the tape feeder and its vicinity shown in FIG. 1.

A swinging shaft (144) is revolvably attached to the bracket (142), and a revolving shaft (146) is co-axially revolvably attached to the swinging shaft (144). A pair of guide plates (148) and a tape guide (150) are attached to the swinging shaft (144), so as to guide the insulation tape (44C) from a tape holder (152) (further described below) to the revolving ring (28) through a tape guiding gap (153), as shown in FIGS. 9 and 11. A tape driving roller (154) is rotatably arranged between the pair of guide plates (148) around the swinging shaft (144). A driven gear (156) is fixed to an end of the revolving shaft (146). A feeder motor (158) with a driving gear (160) is attached to one of the guide plates (148), and the driving gear (160) drives the driven gear (156) via an intermediate gear (162).

A third air cylinder device (164) is attached to the guide plates (148). The device (164) transfers an L-shaped part (166) which has a driven roller (168) to be depressed toward and withdrawn away from the tape driving roller (154).

The insulation tape (44C) is inserted between the tape driving roller (154) and the driven roller (168), and then guided to the tape guide (148).

When the tape feeder (140) is activated, the third air-cylinder device (164) is activated to draw the L-shaped part (166), and the driven roller (168) is pressed toward the tape driving roller (154). At the same time, the feeder motor (158) is activated to rotate the driving gear (160) and then the intermediate gear (162), the driven gear (156) and the tape driving roller (154). The insulation tape (44C) is driven between the tape driving roller (154) and the driven roller (168).

When the tape feeder (140) is deactivated, the third air cylinder device (164) is drawn to push the L-shaped part (166) so that the driven roller (168) detaches from the insulation tape (44C). At the same time, the feeder motor (158) is deactivated, and the insulation tape (44C) stops being fed.

The guide plates (148) have a tape sensor (170) at the bottom end (172) and another tape sensor (174) a little above the bottom end.

When there is no insulation tape (44C) at the tape sensor (174), the tape feeder (140) is activated to feed the insulation tape (44C). When the insulation tape (44C) comes to the bottom end (172) of the guide plates (148), the tape feeder (140) is stopped to wait for another signal for feeding a new tape to the revolving ring (28).

The guide plates (148) and the tape guide (150) swing with the swinging shaft (144) in accordance with the change of the thickness of the layer of the insulation tape on the revolving ring (28) so that the insulation tape (44C) goes out of the tape guide (150) to the revolving ring (28) smoothly regardless of the thickness of the layer of the insulation tape (44).

Figure 12:
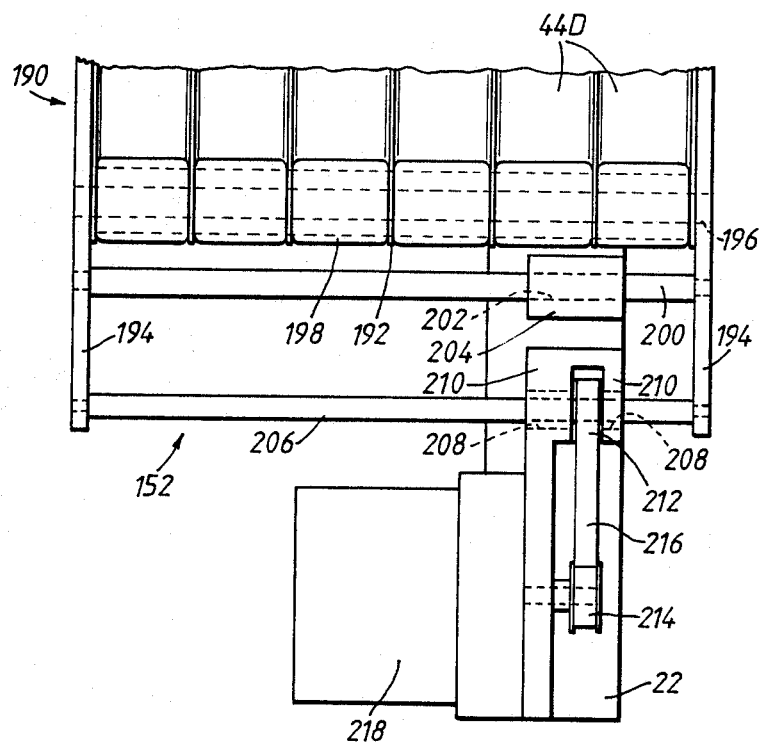
FIG. 12 is an enlarged fractional view of the tape holder taken along line XII—XII of FIG. 1.

Referring to FIGS. 1 and 12, the tape holder (152) is attached to the supporting frame (22) so as to hold spare reeled tapes (44D) to be fed to the tape feeder (140) in series.

The tape holder (152) has a tape container (190), which can hold a plurality of reeled insulation tapes (44D) arranged coaxially and separated with separation plates (192). Both ends of the tape container (190) consist of parallel end plates (194), which are combined by a plurality of parallel supporting roller shafts (196). There are rotatable supporting rollers (198) around the shafts (196), and the supporting rollers (198) support the reeled insulation tapes (44D). Two sliding shafts (200) parallel to the supporting roller shafts (196) connect the end plates (194). The sliding shafts (200) smoothly penetrate holes (202) in brackets (204) which are fixed to the supporting frame (22). A threaded shaft (206), also parallel to the roller supporting shaft (196), connects the end plates (194). The threaded shaft (206) loosely penetrates two holes (208) bored in two projections (210) on the supporting frame (22). A threaded pulley (212) with a threaded hole is engaged with the threaded shaft (206) between the two projections (210).

The threaded pulley (212) is driven by a driving pulley (214) with a looped belt (216). The driving pulley (214) is directly driven by a motor (218) which is fixed on the supporting frame (22).

When the motor (218) is activated, the driving pulley (214) rotates, the threaded pulley (212) rotates, the threaded shaft (206) is driven in the axial direction, and the whole tape container (190) is moved in the direction of the axis of the reels of the insulation tapes (44D).

Now the operation of the taping device is described below. The electrical conductor bar (20) is fixed on a stable bed.

Insulation tapes (44) are wound in series around the revolving ring (28) up to a pertinent thickness of the layer of the tapes (44). Then the inner part of the tapes (44A) is drawn through a gap between two adjacent circumferential rollers (38) to one end of the conductor bar (20) via the third guide roller (64), the drifting roller (72), the second guide roller (52) and the first guide roller (50).

Then the main motor (34) is activated, the revolving ring (28) revolves around the conductor bar (20) and the tape (44A) is wound around the bar (20). At the same time, the supporting frame (22) is moved along the conductor bar (20), so the tape (44A) is wound helically.

The tension of the tape (44) and (44A) is controlled by the tension shoe (76) depending on the movement of the swinging lever (66).

When the thickness of the layer of the insulation tapes (44) on the revolving ring (28) detected by the thickness detector (80) becomes less than a stipulated value, the tape connecting operation is started automatically while the operation of winding the tape (44A) around the bar (20) is continued, as follows. When the accumulated thickness of the tape (44) on the revolving ring (28) becomes less than a stipulated value, the adhesive feeder (90) starts operation, and the stipulated amount of the adhesive (96) is adhered to the insulation tape (44) near the outer end (44B) of the tape (44).

Then the tape feeder (140) starts operation, and an insulation tape (44C) from the tape feeder (140) is connected by the adhesive (96) and fed to the revolving ring (28) until the entire single reel of tape (44D) in the tape container (190) is consumed. When the reeled tape (44D) is consumed, the tape sensor (174) detects the absence of the tape (44C), and the tape feeder (140) stops operation. Then the tape holder (152) starts operation so that the next reeled tape (44D) is moved into a position in which it is ready to be fed. When the tape container (190) has moved one reeled tape width, it stops. Then the tape (44C) from a new reel is guided through the tape feeder (140) until the end of the tape (44C) comes down to the bottom end (172) of the guide plates (148). When the tape sensor (170) at the bottom end (172) of the guide plates (148) detects the tape (44C), the tape feeder (140) stops, until another control signal comes from the thickness detector (80) requiring another reel of tape.

The operation of winding the tape (44A) around the bar (20) is continued automatically, regardless of the states of the adhesive feeder (90), the tape feeder (140) or the tape holder (152). Therefore, this taping device can save time and manpower for connecting tapes.

Figure 13:
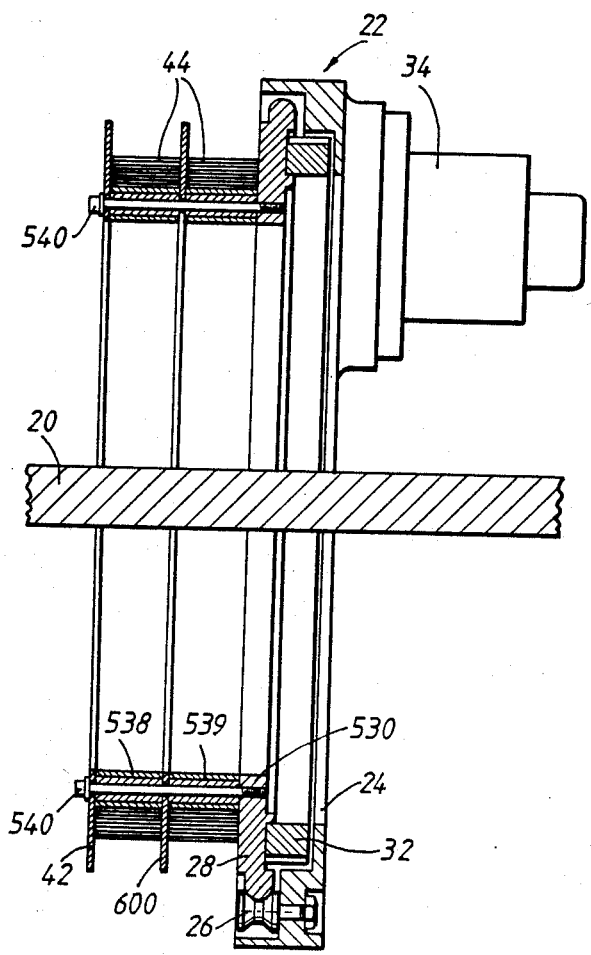
FIG. 13 is a fractional cross-sectional view of a second embodiment.

In the second embodiment shown in FIG. 13, each of the circumferential roller axes (540) is long enough to hold two circumferential rollers (538) and (539) arranged in series, and a separation ring plate (600) similar to the ring plate (42) is fixed to the circumferential roller axes (540) between the circumferential rollers (538) and (539) parallel to the ring plate (42). Two insulation tapes (44) are wound around the circumferential rollers (538) and (539). Two tapes (44) are simultaneously wound on the conductor bar (20) with two adhesive feeders (90), two tape feeders (140) and two tape holders (152), which increases the efficiency of the taping device.

The adhesive (96) is applied on the insulation tape (44) as an adhesive tape (92) with a separation tape (94) in the embodiment described above. However, adhesive can be pasted or ejected onto the insulation tape (44) in alternate embodiments.

The foregoing description has been set forth merely to illustrate preferred embodiments of the invention and is not intended to be limiting. Since modifications of the described embodiments incorporating the spirit and substance of the invention may occur to persons skilled in the art, the scope of the invention should be limited solely with respect to the appended claims and equivalents.

What is claimed is:

1. A taping device comprising:

a supporting frame which is adapted to be driven along an object to be wound with an insulation tape;

a revolving ring revolvably arranged on the supporting frame, wherein the revolving ring has a layer of insulation tape around it;

means for rotating the ring around the object to wind the insulation tape under tension around the object;

means for detecting a thickness of the layer of the insulation tape on the revolving ring;

an adhesive feeder for feeding an amount of adhesive onto the outside surface of the insulation tape on the revolving ring when the thickness of the layer of the insulation tape on the revolving ring is less than a predetermined value;

a tape feeder for feeding an auxiliary insulation tape to the layer of the insulation tape around the revolving ring after the adhesive is fed onto the insulation tape on the revolving ring; and a tape holder arranged on the supporting frame for holding a plurality of reeled auxiliary insulation tapes and including means for supplying the auxiliary insulation tapes to the tape feeder one after another.

2. A taping device according to claim 1, wherein the revolving ring comprises a plurality of guide rollers for guiding the insulation tape to the object, and a swinging lever with a swinging roller which is in contact with the insulation tape and swings in accordance with the tension of the insulation tape.

3. A taping device according to claim 1, further comprising a tension shoe for controlling the tension of the insulation tape on the revolving ring by friction force, attached to the supporting frame.

4. A taping device according to claim 1, wherein the revolving ring comprises a plurality of circumferential rollers around which the insulation tape is wound, and which are arranged with gaps for the insulation tape to pass through.

5. A taping device according to claim 1, wherein the adhesive feeder comprises:

an adhesive tape comprising a separation tape and an adhesive layer which is adhered to the separation tape;

means for pressing the adhesive tape onto the insulation tape on the revolving ring so that the adhesive adheres to the insulation tape; and means for winding the separation tape away from the adhesive which is adhered to the insulation tape.

6. A taping device according to claim 5, wherein said means for winding the separation tape comprises:

a separation tape reel on which the separation tape is wound; and means for driving the separation tape reel only when the adhesive tape is pressed onto the insulation tape on the revolving ring.

7. A taping device according to claim 1, wherein the tape feeder comprises:

a feeder motor;

a tape driving roller which is driven by the feeder motor;

a driven roller, which is adapted to be pressed toward the driving roller with the insulation tape inserted between the tape driving roller and the driven roller so as to drive the insulation tape; and means for selectively pressing the driven roller toward the driving roller.

8. A method of winding an insulation tape around an object, comprising the steps of:

(a) feeding an insulation tape under a tension around the object from an inner end of a layer of insulation tapes on a revolving ring which continuously revolves around the object;

(b) detecting the thickness of the layer of the insulation tape on the revolving ring;

(c) feeding an amount of adhesive onto the insulation tape on the revolving ring when the thickness of the layer of the insulation tape on the revolving ring becomes less than a predetermined value;

(d) subsequently feeding an auxiliary reel of insulation tape to the outside of the layer of the insulation tape on the revolving ring;

(e) holding a plurality of auxiliary reels of insulation tape; and (f) repeating steps (b) through (d) to feed said plurality of auxiliary reels of insulation tape one after another.

9. A method according to claim 8, further comprising the step of controlling the tension of the insulation tape by pressing a tension shoe onto the insulation tape on the revolving ring.

10. A method according to claim 8, wherein the step of feeding the adhesive comprises the step of pressing an adhesive tape, which has a separation tape and adhesive layer adhered to the separation tape, onto the insulation tape on the revolving ring.

* * * * *